(12) United States Patent
Tan et al.

(10) Patent No.: US 8,441,447 B2
(45) Date of Patent: May 14, 2013

(54) TOUCH SENSOR KEYPAD WITH TACTILE FEEDBACK MECHANISMS AND ELECTRONIC DEVICE WITH THE SAME

(75) Inventors: Yun Long Tan, Taoyuan County (TW); Yien Chun Kuo, Taoyuan County (TW)

(73) Assignee: HTC Corporation (TW)

( * ) Notice: Subject to any disclaimer, the term of this patent is extended or adjusted under 35 U.S.C. 154(b) by 0 days.

(21) Appl. No.: 13/532,920

(22) Filed: Jun. 26, 2012

(65) Prior Publication Data

US 2012/0268380 A1 Oct. 25, 2012

Related U.S. Application Data

(62) Division of application No. 12/346,511, filed on Dec. 30, 2008, now Pat. No. 8,228,297.

(30) Foreign Application Priority Data

Dec. 31, 2007 (TW) ................................ 96151360 A

(51) Int. Cl.
*G06F 3/02* (2006.01)

(52) U.S. Cl.
USPC ........................................................ 345/168

(58) Field of Classification Search ........................ None
See application file for complete search history.

(56) References Cited

U.S. PATENT DOCUMENTS

| | | | |
|---|---|---|---|
| 6,869,239 B2 | 3/2005 | Morris | |
| 7,336,206 B2 * | 2/2008 | Sugimura et al. | 341/22 |
| 8,120,584 B2 * | 2/2012 | Grivna et al. | 345/169 |
| 2002/0033795 A1 * | 3/2002 | Shahoian et al. | 345/156 |
| 2004/0183783 A1 | 9/2004 | Rojas et al. | |
| 2005/0035949 A1 | 2/2005 | Beck et al. | |
| 2005/0253643 A1 * | 11/2005 | Inokawa et al. | 327/517 |
| 2005/0275508 A1 | 12/2005 | Orr et al. | |
| 2006/0232558 A1 * | 10/2006 | Chien | 345/168 |
| 2007/0063976 A1 * | 3/2007 | Oga | 345/168 |
| 2007/0091070 A1 * | 4/2007 | Larsen et al. | 345/168 |
| 2009/0073128 A1 * | 3/2009 | Marsden | 345/168 |
| 2009/0167694 A1 | 7/2009 | Tan et al. | |
| 2010/0052880 A1 | 3/2010 | Laitinen et al. | |

FOREIGN PATENT DOCUMENTS

| | | |
|---|---|---|
| CN | 1924775 | 3/2007 |
| JP | 2005258666 A | 9/2005 |
| TW | 200414003 | 8/2004 |
| WO | 03038800 | 5/2003 |
| WO | 2006094308 | 9/2006 |

OTHER PUBLICATIONS

Eve Hoggan et al. "Investigating the Effectiveness of Tactile Feedback for Mobile Touchscreens"; CHI 2008 Proceedings, Tactile and Haptic User Interfaces; Apr. 5-10, 2008—Florence, Italy; pp. 1573-1581; XP002525519.

* cited by examiner

*Primary Examiner* — Peter Vincent Agustin

(74) *Attorney, Agent, or Firm* — Lowe Hauptman Ham & Berner, LLP

(57) ABSTRACT

An electronic device includes an input module, which has a plurality of first keys, a plurality of second keys, a first vibration element and a second vibration element. When any one of the first keys is pressed or touched, the first vibration element vibrates accordingly; and when any one of the second keys is pressed or touched, the second vibration element vibrates accordingly thereby providing a tactile feedback to a user.

10 Claims, 2 Drawing Sheets

TOUCH SENSOR KEYPAD WITH TACTILE FEEDBACK MECHANISMS AND ELECTRONIC DEVICE WITH THE SAME

CROSS REFERENCE TO RELATED APPLICATION

This application is a divisional application of U.S. application Ser. No. 12/346,511 filed Dec. 30, 2008, which is now U.S. Pat. No. 8,228,297, the full disclosure of which is incorporated herein by reference.

BACKGROUND

1. Technical Field

The disclosure relates to a touch keyboard and an electronic device with the same, and more particularly, to a touch keyboard with tactile feedback mechanisms and an electronic device with the same.

2. Description of the Related Art

Almost all of the computers are provided with keyboards for users to enter information thereinto. Most of them are mechanical keyboards. The mechanical keyboards can provide a tactile feedback to users when the keys on the keyboards are pressed. The users can know whether the key is pressed with the tactile feedback. However, the mechanical keyboards are very bulky. They are usually not suitable for hand-held electronic devices. For at least this reason, the novel hand-held electronic devices have been provided with, for example, touch keyboards because the touch keyboards are very thin in comparison with the mechanical keyboards. However, the touch keyboards fail to provide a tactile feedback to users. Accordingly, the users are unable to know whether they have indeed pressed the keys in lack of a tactile feedback. In order nevertheless to give the users a feedback, acoustical or optical signals are alternatively generated as feedback. Many users, however, prefer a direct tactile feedback rather than an acoustical or optical signal. It is also known that a person reacts more slowly to optical and acoustical stimuli than to tactile stimuli.

SUMMARY

It is an object of the present disclosure to provide a keyboard module with vibration tactile feedback mechanisms, wherein users can feel a vibration tactile feedback when they touches or presses the keys on the keyboard module.

In order to achieve the above object, the keys on the keyboard module of the present disclosure are divided into at least two groups. Each of the key groups is provided with a vibration element disposed there under. When any one of the keys is touched, the vibration element under the key group to which the touched key belongs will vibrate accordingly thereby providing a tactile feedback to a user.

It is another object of the present disclosure to provide an electronic device with the keyboard module of the present disclosure.

Since the keyboard module according to the present disclosure is provided with vibration elements, the vibration elements can provide a vibration tactile feedback to a user when the keys of the keyboard are pressed. The user can know whether the key is indeed pressed with the vibration tactile feedback. Furthermore, several keys are equipped with a common vibration element to provide a vibration tactile feedback according to the present disclosure, the production cost is not significantly increased and the available space inside the keyboard module is not substantially reduced accordingly with the introduction of the vibration elements. According to the present disclosure, the vibration intensity of the vibration elements can depend on which key is touched so that a user can still feel a substantially uniform vibration feedback when different keys are touched.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
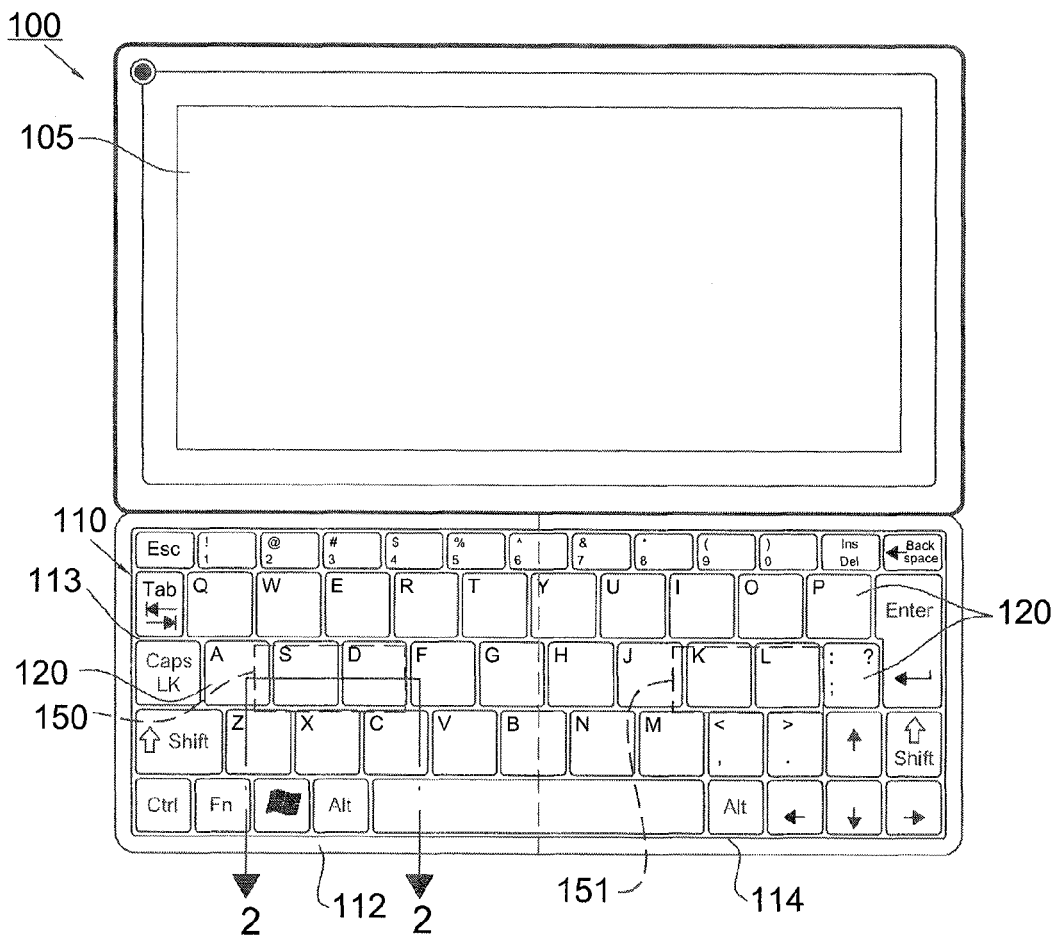
FIG. 1 illustrates the electronic device having a keyboard module with tactile feedback mechanisms according to the first embodiment of the present disclosure.
Figure 2:
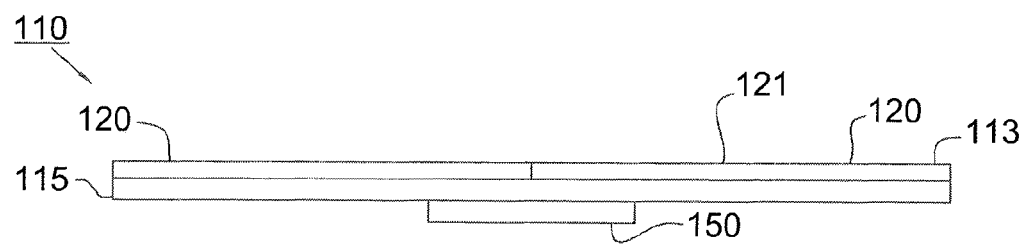
FIG. 2 is a cross-sectional schematic view taken along line 2-2 of FIG. 1.

FIG. 1 illustrates an electronic device having a keyboard module with tactile feedback mechanisms according to the first embodiment of the present disclosure. FIG. 2 is a cross-sectional schematic view taken along line 2-2 of FIG. 1. Referring to FIGS. 1 and 2, the electronic device 100 includes a display 105 and a keyboard module 110 for a user to enter characters and show the same on the display 105. In this embodiment, keyboard module 110 includes a keyboard 113, a touch sensing element 115 and two vibration elements 150, 151. The keyboard 113 has a plurality of keys 120 for a user to enter characters such as numbers, letters or symbols and show the same on the display 105. In this embodiment, the keys 120 are integrally formed on a plane to form a continuous touch surface 120. Some of the keys 120 are marked with twenty-six (26) English letters respectively and these English letters are arranged in accordance with the arrangement of the English letters on a standard QWERTY keyboard. These letter keys 120 can also be marked with numbers, symbols or punctuation marks.

The touch sensing element 115 is disposed under the keyboard 113 for detecting touches on the keys 120. When any one of the keys 120 is touched and then the touch is detected by the touch sensing element 115, the character or symbol marked on the touched key 120 will be entered and shown on the display 105. In this embodiment, the touch sensing element 115 can be a capacitive touch sensor.

In this embodiment, to enable a user to experience a tactile feedback when the user touches the keys 120, two vibration elements 150 and 151, such as piezoelectric elements are disposed under the keyboard 113. When any one of the keys 120 is touched by a user, the touch sensing element 115 will send a signal to render the vibration element 150 or 151 vibrate. The vibration is transmitted to the keyboard 113 so that the user can experience a vibration tactile feedback. The above will now be described in detail below.

In this embodiment, the keyboard 113 is divided into at least two key groups 112 and 114, which are separated from each other substantially by the vertical dashed line in FIG. 1. Each of the key groups 112, 114 has a part of the keys 120. The vibration elements 150 and 151 are disposed under the key groups 112 and 114, respectively. When any one key 120 in the key group 112, e.g. the key marked with "Q", "W", "E", "R", "T", "A", "S", "D", "F", "G", "Z", "X", "C", "V" or "B", is touched, the touch sensing element 115 will send a signal to render the vibration element 150 vibrate. Similarly, when any one key 120 in the key group 114, e.g. the key marked with "Y", "U", "I", "O", "P", "H", "J", "K", "L", "N" or "M", is touched, the touch sensing element 115 will send a signal to render the vibration element 151 vibrate. In brief, when any one key 120 in the key group 112 or 114 is touched, the vibration element disposed under the touched key group vibrates. The other vibration element will not vibrate.

Additionally, in one preferred embodiment, in order to provide a substantially uniform vibration feedback to a user, the vibration intensity of the vibration elements 150, 151 will depend on which key 120 is touched. More specifically, the touch on the key 120 farther away from the vibration element 150 or 151 will cause the corresponding vibration element 150 or 151 to generate a stronger vibration while the touch on the key 120 closer to the vibration element 150 or 151 will cause the corresponding vibration element 150 or 151 to generate a weaker vibration. In order to achieve the above object, the vibration intensity of the vibration elements 150, 151 is proportional to the distance between the vibration element 150 or 151 itself and the touched key 120. For example, the touch on the key 120 marked with "G" will cause the vibration element 150 to generate a vibration stronger than the vibration the touch on the key 120 marked with "S" may cause because the key "G" is farther away from the vibration element 150 than the key "S". For another example, the touch on the key 120 marked with "Y" will cause the vibration element 151 to generate a vibration stronger than the vibration the touch on the key 120 marked with "L" may cause because the key "Y" is farther away from the vibration element 151 than the key "L".

Figure 3:
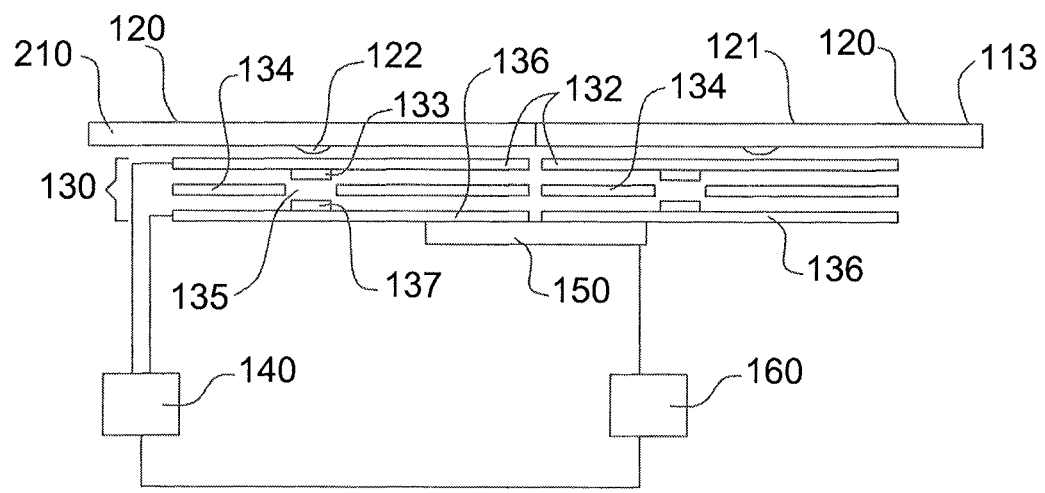
FIG. 3 is a cross-sectional schematic view of the keyboard module with tactile feedback mechanisms according to another embodiment of the present disclosure.

In other embodiments, some sensors or detectors other than the touch sensing element 115 described above can also be used to sense/detect the touch on the keys 120 of the keyboard 113 so as to enter characters and show the same on the display 105. FIG. 3 is a cross-sectional schematic view of the keyboard module with tactile feedback mechanisms according to another embodiment of the present disclosure, where identical reference numerals have been used when designating substantially identical elements that are common to the figures. Thus, any further illustrations of the identical elements are omitted herein. In the keyboard module 210, a plurality of switches 130 are disposed under the keys 120, and each of the switches is configured for detecting a corresponding press on each of the key 120 respectively. The switches 130 are such as membrane switches and electrically connected to a detection circuit 140. The membrane switch 130 includes three films 132, 134, 136. The uppermost and lowermost films 132, 136 are provided with electrodes 133 and 137, respectively that are arranged face to face with each other through an opening 135 on the intermediate film 134. When any one of the keys 120 is pressed by a user, the protrusion 122 beneath the pressed key 120 will press the electrode 133 down to contact with the electrode 137 to switch on the switch 130. When the switch 130 is switched on, the detection circuit 140 will detect one press on the key 120 and then send a signal to a driving circuit 160 accordingly. Afterward, the driving circuit 160 will activate the corresponding vibration element 150 or 151 in response to the signal thereby causing a vibration. The vibration is transmitted to the keyboard 113 so that the user can experience a vibration tactile feedback.

It is to be noted that the vibration element 150 in this embodiment can be optionally disposed under the membrane switches 130 and the vibration thereof is transmitted to the keys 120 through the membrane switches 130. Alternatively, the vibration element 150 is disposed in such a manner that the vibration thereof can be transmitted to the keys 120 without the need of the membrane switches 130. In addition, in other embodiments, the keys 120 can be optionally divided into more than two key groups and each of the key groups is provided with a vibration element disposed there under so that the object of providing tactile feedback mechanisms to the key groups can be achieved.

Since the keyboard module of the present disclosure is provided with vibration elements, the vibration elements can provide a vibration tactile feedback to a user when the keys of the keyboard are pressed. The user can know whether the key is indeed pressed with the vibration tactile feedback. Furthermore, several keys are equipped with a common vibration element to provide a vibration tactile feedback according to the present disclosure, the production cost is not significantly increased and the available space inside the keyboard module is not substantially reduced accordingly with the introduction of the vibration elements. According to the present disclosure, the vibration intensity of the vibration elements can depend on which key is touched so that a user can still feel a substantially uniform vibration feedback when different keys are touched.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An electronic device, comprising:
a display; and
an input module for entering characters on the display, the input module comprising:
an input device having a plurality of first keys and a plurality of second keys;
a touch sensing element disposed under the input device and configured to detect a touch on one of the first and second keys;
a first vibration element disposed under the input device and configured to vibrate when the touch sensing element detects the touch on one of the first keys; and
a second vibration element disposed under the input device and configured to vibrate when the touch sensing element detects the touch on one of the second keys.

2. The electronic device as claimed in claim 1, wherein the first and second keys are integrally formed on a plane.

3. The electronic device as claimed in claim 1, wherein the touch sensing element is a capacitive touch sensor.

4. The electronic device as claimed in claim 1, wherein a vibration intensity of the first vibration element is proportional to a distance between the first vibration element and the touched first key.

5. The electronic device as claimed in claim 4, wherein a vibration intensity of the second vibration element is proportional to a distance between the second vibration element and the touched second key.

6. The electronic device as claimed in claim 1, wherein the first and second keys together are marked with twenty-six English letters and the English letters are arranged in accordance with an arrangement of the English letters on a standard QWERTY keyboard.

7. An input module, comprising:
an input device having a plurality of first keys and a plurality of second keys;

a touch sensing element disposed under the input device and configured to detect a touch on one of the first and second keys;

a first vibration element disposed under the input device and configured to vibrate when the touch sensing element detects the touch on one of the first keys; and a second vibration element disposed under the input device and configured to vibrate when the touch sensing element detects the touch on one of the second keys.

8. The input module as claimed in claim 7, wherein the touch sensing element is a capacitive touch sensor.

9. The input module as claimed in claim 7, wherein the first and second keys together are marked with twenty-six English letters and the English letters are arranged in accordance with an arrangement of the English letters on a standard QWERTY keyboard.

10. The input module as claimed in claim 7, wherein the first and second keys are integrally formed on a plane.

\* \* \* \* \*